Patented May 27, 1924.

1,495,893

UNITED STATES PATENT OFFICE.

LOUIS C. DREFAHL, OF LAKEWOOD, AND CHARLES H. SAKRYD, OF CLEVELAND, OHIO, ASSIGNORS TO THE GRASSELLI CHEMICAL COMPANY, OF CLEVELAND, OHIO, A CORPORATION OF OHIO.

PROCESS OF MAKING BARIUM CHLORIDE.

No Drawing. Application filed March 6, 1922. Serial No. 541,583.

*To all whom it may concern:*

Be it be known that we, (1) LOUIS C. DREFAHL and (2) CHARLES H. SAKRYD, citizens of the United States, residing at (1) Lakewood and (2) Cleveland, in the county of Cuyahoga and State of Ohio, have invented certain new and useful Improvements in Processes of Making Barium Chloride, of which the following is a specification.

This invention relates to a process of making barium chloride and more particularly to the production of barium chloride from waste barium containing material, such as barium vat waste.

In the commercial preparation of barium sulfid it is customary to mix more or less finely ground barium sulfate containing material, such as barytes, with a suitable carbonaceous fuel, such as coal or coke and heat the mixture in a suitable furnace or retort. The product of this treatment is known as barium sulfid black ash. The black ash is leached with water yielding a solution of barium sulfid and an insoluble residue known as barium vat waste. The vat waste contains more or less raw unconverted ore and gangue matter, and other insoluble products, such as, barium carbonate, barium silicate, barium hyposulfite, barium sulfite, etc., together with more or less carbonaceous material.

On a dry basis the vat waste contains on an average from 35 to 40 per cent of barium calculated as sulfate and from 8 to 15 per cent of combustible matter.

This residue or vat waste has been of no economic value because of the lack of a satisfactory process by means of which it could be economically treated for the recovery of the barium content.

It has been attempted to recover the barium content of the vat waste by mixing it with an alkaline earth metal chloride and calcining the mixture in order to convert the barium content to chloride. It has also been attempted to recover the barium content of the vat waste by leaching with acid. Both of these methods have, however, proven to be unattractive commercially.

According to our process the vat waste is first dried sufficiently for further treatment by storing it in piles or heaps. The material, when stored, develops heat which assists the drying operation. Complete dehydration is not necessary. The material is sufficiently dry for further treatment when it is dry to the touch.

The partially dried residues are then mixed with fused or granulated commercial calicum chloride in quantity theoretically sufficient to combine with all of the barium in the residues. The mixture is conveniently formed in a concrete mixer. Additional fuel may also be incorporated in the mixture but ordinarily the addition of fuel is unnecessary. The mixture is then fed into a blast roasting apparatus similar to or operating upon the same principle as the Huntington-Heberlein pot or a Dwight Lloyd sintering apparatus in which it is blast roasted until thoroughly sintered. The heat necessary for this operation is produced wholly by the combustion of the carbonaceous content of the mixture.

The sintered charge is then leached in the usual way to separate the water soluble content.

It is possible by operating in this manner to recover a considerable portion (from 75 to 80 per cent) of the barium content of the vat waste in the form of barium chloride sufficiently pure for commercial use. The barium chloride product, obtained by leaching the sintered product of the blast roasting operation, filtering, evaporating and crystallizing the filtered solution, contains only very small amounts of impurities, principally calcium chloride.

As pointed out above the carbonaceous content of the vat waste ordinarily is sufficient but in some cases when the carbonaceous content of the waste is very low it may be necessary to supply additional fuel. The use of heat produced by the combustion of fuel extraneous to the mixture is, however, completely avoided. The process is very economical in the use of fuel. None is required for drying the vat waste and ordinarily none is required for sintering it.

The vat waste accruing from the black ash leaching operation is an ideal porous material for our blast roasting process.

Our process is not limited to the recovery of the barium content of vat waste. Barium containing materials other than vat waste may be used. We have also found that raw barium ore such as barytes may be added to the mixture of vat waste and calcium chloride and the barium content of the ore economically recovered along with the barium content of the vat waste. Mixtures containing barytes amounting to 50 per cent of the vat waste in the mixture have been successfully treated. The addition of barytes or other barium ore to the charge is especially advantageous when the vat waste has a high carbonaceous content, the barium content of both the vat waste and the added ore being recovered without the use of added fuel. However, the treatment of raw ore along with the vat waste is not limited to the case in which the waste contains sufficient fuel because additional fuel may be added if necessary.

When barium ore is added to the charge it is of course necessary to supply calcium chloride in quantity sufficient to convert the barium content of the ore to chloride.

The process may even be extended to the manufacture of barium chloride from barium containing materials which do not contain carbonaceous material. Thus barytes may be mixed with calcium chloride equivalent to the barium content of the barytes and fuel sufficient when burned to reduce the sulfate and the mixture blast-roasted and leached as described above, whereby the barium content of the barytes is economically recovered in the form of chloride.

Our process thus affords a simple and economical method for the production of a high grade of commercial barium chloride. The operation of the process is simple, and the raw materials are inexpensive, and expense for fuel is wholly or largely avoided.

We claim:

1. Process of making barium chloride which comprises blast-roasting a mixture of barium containing material, a chloride of an alkaline earth metal other than barium chloride, and a carbonaceous fuel.

2. Process of making barium chloride which comprises blast-roasting a mixture containing barium waste material, a chloride of an alkaline earth metal other than barium chloride, and carbonaceous material.

3. Process of making barium chloride which comprises blast-roasting a mixture containing a barium waste material, a raw barium ore, a chloride of an alkaline earth metal other than barium chloride, and carbonaceous material.

4. Process of making barium chloride which comprises blast-roasting a mixture comprising barytes, calcium chloride, and barium vat waste which contains carbonaceous material.

5. Process of making barium chloride which comprises, forming a mixture of barium vat waste with a chloride of an alkaline earth metal other than barium chloride, and blast-roasting the mixture.

6. Process of recovering the barium content of barium vat waste which comprises, mixing the vat waste with calcium chloride chemically equivalent to the barium content of the vat waste, and blast-roasting the mixture.

7. Process of recovering the barium content of barium vat waste which comprises, storing the vat waste in heaps or piles until it is partially dried, mixing the partially dried vat waste with calcium chloride chemically equivalent to the barium content of the vat waste, sintering the mixture by blast-roasting the same, and leaching the sintered mixture.

8. Process of making barium chloride which comprises drying barium vat waste by storing it in heaps or piles, mixing the dried vat waste with 50 per cent of its weight of barytes and calcium chloride in quantity chemically equivalent to the barium content of the mixture, sintering the mixture by blast-roasting the same, and leaching the sintered mixture.

9. Process of making barium chloride which comprises drying barium vat waste solely by storing the same in heaps or piles, mixing the vat waste with calcium chloride, and sintering the mixture solely by means of heat developed from the combustion of carbonaceous material in the vat waste.

In testimony whereof, we affix our signatures.

LOUIS C. DREFAHL.
CHARLES H. SAKRYD.